Oct. 11, 1955     A. S. VANDERHOOF     2,720,616
RECTIFIER ASSEMBLY
Filed July 28, 1952                            2 Sheets-Sheet 1
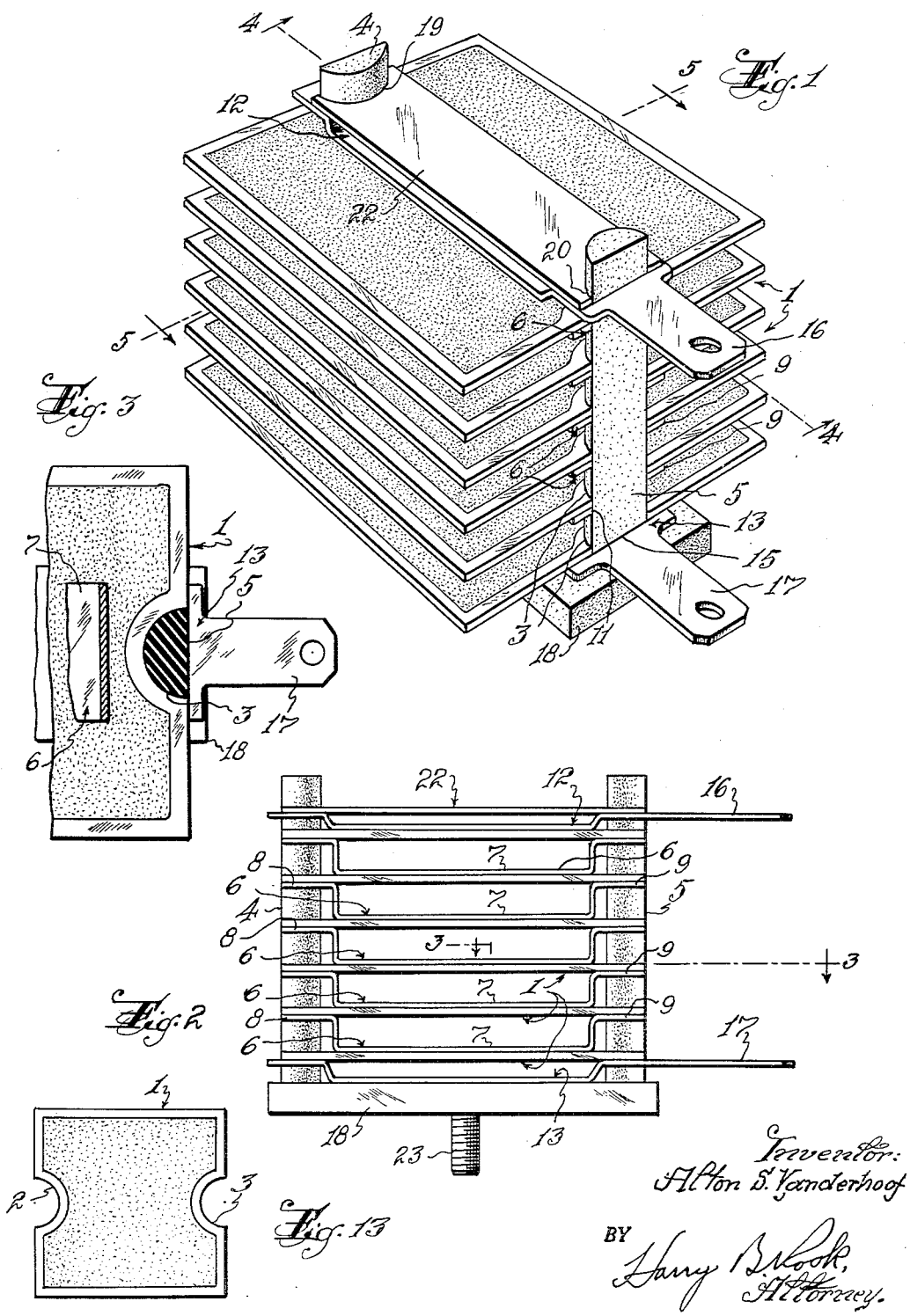
Inventor:
Alton S. Vanderhoof
BY Harry B. Rook,
Attorney.

Oct. 11, 1955 A. S. VANDERHOOF 2,720,616
RECTIFIER ASSEMBLY
Filed July 28, 1952 2 Sheets-Sheet 2
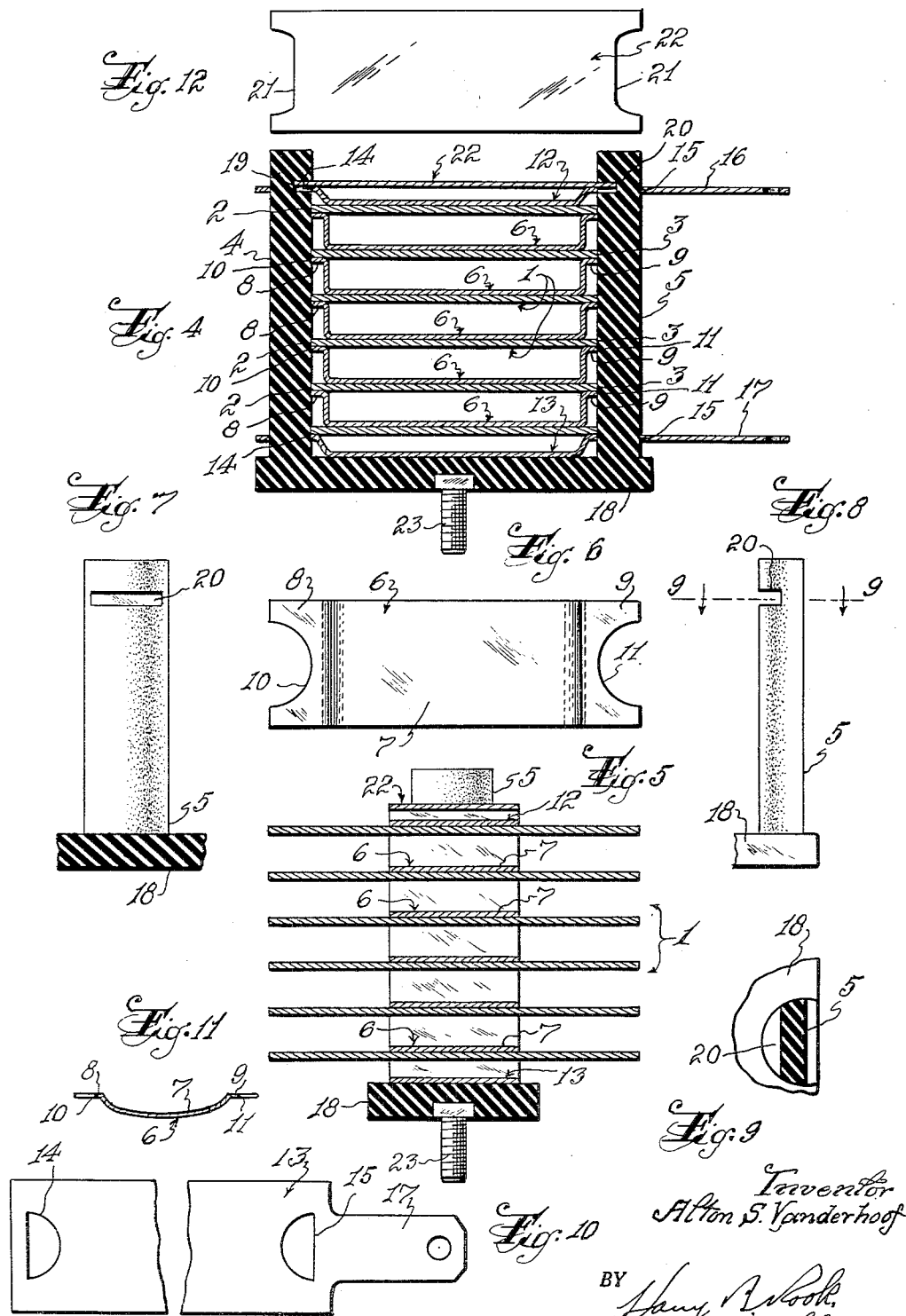

United States Patent Office 2,720,616
Patented Oct. 11, 1955

2,720,616

RECTIFIER ASSEMBLY

Alton S. Vanderhoof, Irvington, N. J.

Application July 28, 1952, Serial No. 301,180

6 Claims. (Cl. 317—234)

My invention relates to a rectifier assembly and more particularly to a rectifier assembly having a plurality of rectifier plates stacked one above the other which are held in assembled relationship in a novel and improved manner.

Heretofore, most rectifier assemblies including a stack of rectifier plates have been made with central binding posts extending through rather large openings centrally located in each of the plates. The plates would be arranged upon the central binding post in spaced relationship and end terminal strips would be provided for holding the parts of the rectifier in their assembled positions.

It is an object of my invention to provide a rectifier assembly including a stack of rectifier plates wherein the central opening heretofore required in each of the plates is omitted to produce a rectifier that is heated and cooled more uniformly and has superior electrical characteristics because of the less likelihood of damage to the plate in its manufacture and assembly.

It is another object of my invention to provide a rectifier assembly of the described type wherein the rectifier plates are held in spaced relationship between a pair of upright insulating members in contact with the edges of the plates, and suitable metallic strips in contact with the upright members and with end plates of the stack are provided at opposite ends of the stack to hold the plates in their assembled positions.

Other objects and advantages of my invention will become apparent as the course of the specification progresses.

To attain the objects and advantages of my invention, I provide a plurality of rectifier plates stacked one above the other and in contact at opposite edges with a pair of upright insulating members. The plates are spaced apart one from the other by suitable metallic spring spacer elements which exert a separating force upon the plates. The plates are however held in an assembled relationship in which they are separated from each other by a predetermined distance, by a pair of metallic strips located at opposite ends of the plate stack and in contact with the upright insulating members and end plates.

I shall describe one form of my invention and then point out the novel features thereof in claims.

In the accompanying drawings,

Fig. 1 is a perspective view of a rectifier assembly constructed in accordance with my invention.

Fig. 2 is a front view of the rectifier assembly of Fig. 1.

Fig. 3 is a sectional view taken on the plane of the line 3—3 of Fig. 2.

Fig. 4 is a sectional view taken on the plane of the line 4—4 of Fig. 1.

Fig. 5 is a sectional view taken on the plane of the line 5—5 of Fig. 1.

Fig. 6 is a top plan view of a spring spacer element.

Fig. 7 is a front view of one of the insulating posts.

Fig. 8 is an end view of the insulating post of Fig. 7.

Fig. 9 is a cross-sectional view of the end post taken on the plane of line 9—9 of Fig. 8.

Fig. 10 is a top plan view of one of the metallic strips provided at opposite ends of the stack.

Fig. 11 is a reduced sectional view of spring spacer element shown apart from the assembly.

Fig. 12 is a top plan view of the locking strip which is employed at the top of the rectifier assembly.

Fig. 13 is a top plan view of one of the rectifier plates.

Referring to the drawings, reference character 1 designates a plurality of rectifier plates preferably of the type known as selenium rectifiers which may be formed in any suitable manner and comprise a metallic base plate having a thin layer of selenium applied thereon. The plate also includes a barrier layer which is applied on to the selenium layer by vapor fuming or other processes and a counter-electrode layer applied in a suitable manner over the barrier layer.

The rectifier plates are provided at opposite edges with cut-out portions or notches 2 and 3, and are disposed between a pair of upright insulating semi-cylindrical posts 4 and 5 with the notched edges or cut-out portions of the plates embracing the curvilinear surfaces of the posts. Interposed between the rectifier plates are the metallic spring spacer elements 6 which hold the plates in spaced relationship. Each spacer element 6 includes a base portion 7 in contact with one plate, and flange portions 8 and 9 in contact with the next overlying plate. Flange portions 8 and 9 are provided with notches 10 and 11 respectively which embrace the curvilinear surfaces of the posts.

The spacer elements assume a somewhat bowed appearance apart from the rectifier assembly, their base portions 7 being arced as shown in Fig. 11. In their assembled condition, however, spacer elements 6 assume a position such that the base portions 7 are substantially horizontal. A separating force is therefore exerted by the spacer elements upon each of the plates tending to move the plates from their assembled positions between the insulating posts. The plates are however held in position by a pair of metallic strips 12 and 13 located at opposite ends of the stack of plates and in contact with the end plates and with the insulating posts. These strips are provided at opposite ends with semi-circular openings 14 and 15 so that the strips may be force fitted over the posts with the straight portions of such openings in tight fitting contact whereby the strips are held securely in position on the posts. Strips 12 and 13 preferably include extended portions 16 and 17 respectively which project beyond the end of the rectifier assembly and to which leads may be attached for securing the rectifier in an electrical circuit.

As shown, insulating posts 4 and 5 may be integrally formed at corresponding ends with an insulating block or base plate 18 and the other ends of the posts may be provided with grooves 19 and 20 to receive the notched ends 21 of a locking strip 22 for securely locking the various parts of the rectifier assembly in their assembled positions. Locking strip 22 is assembled on the posts by initially bowing the strip upwardly to align notched ends 21 with grooves 19 and 20 and is then pressed downwardly to force the ends into the grooves. Insulating block 18 may be provided with means for mounting the rectifier assembly upon a support and as shown may comprise a screw 23 projecting from the underside thereof and having its head centrally secured in the block against turning.

Although I have herein shown and described only one form of rectifier assembly embodying the features of my invention, it is to be understood that various changes and modifications may be made therein within the scope of the appended claims without departing from the spirit and scope of my invention.

Having thus described my invention, what I claim is:

1. A rectifier assembly comprising spaced and parallel upright insulating posts, a stack of rectifier plates disposed between the posts, each plate having cut-out portions each embracing one of said posts, the edges of the plates being otherwise free and exposed, a plurality of metallic spring spacer elements each disposed between adjacent plates of the stack and in contact therewith, a conducting strip at each end of the stack in contact with at least a portion of the surface of the corresponding end plate and said posts, and means coactive with said posts and said strips for holding the plates, spacer elements and strips in assembled relationship.

2. A rectifier assembly as defined in claim 1 wherein each of the strips has holes through each of which extends one of said posts and includes an extended portion which projects from the rectifier assembly and to which leads may be attached to connect the rectifier assembly in circuit.

3. A rectifier assembly as defined in claim 1 wherein the last-named means includes an insulating base plate at one end of the stack of rectifier plates having corresponding ends of the insulating posts integrally formed therewith and a spring locking strip at the other end of the stack for locking the parts of the rectifier assembly in assembled positions, the end portions of the insulating posts opposite the base plate being provided with grooves and said spring locking strip having notches at opposite ends thereof which register in said grooves, the locking strip being initially bowed upwardly and then pressed downwardly at its center to snap its notched edges into the said grooves.

4. A rectifier assembly as defined in claim 3 with the addition of means mounted on the base plate for attaching the rectifier assembly to a support.

5. A rectifier assembly comprising a pair of upright insulating posts, a stack of rectifier plates disposed between the posts and having edges in contact with said posts, a plurality of metallic spacer elements each disposed between adjacent plates of the stack, a metallic strip at each end of the stack in contact with at least a portion of the surface of an end plate and each of the posts for holding the plates and spacer elements in assembled relationship, each of said strips having an extended portion projecting therefrom to form an electrical terminal for the rectifier assembly, an insulating block in contact with one of said strips, and having corresponding ends of the insulating posts integrally formed therewith, a spring locking strip for locking the parts of the rectifier in assembled positions, said insulating posts being provided at ends opposite from the insulating block with grooves and the spring locking strip having notches at opposite ends thereof which register in said grooves, the spring locking strip being initially bowed upwardly and then pressed downwardly at its center to snap the notched edges of the strip into the grooves.

6. The rectifier assembly as set forth in claim 5 with the addition of means secured to the insulating block for mounting the rectifier assembly on a support.

References Cited in the file of this patent

UNITED STATES PATENTS

| 2,310,444 | Kriebel | Feb. 9, 1943 |
| 2,416,152 | Braun | Feb. 18, 1947 |
| 2,423,091 | Fiore et al. | July 1, 1947 |
| 2,489,767 | Fennema et al. | Nov. 29, 1949 |

FOREIGN PATENTS

| 121,428 | Australia | May 23, 1946 |